United States Patent
Kang et al.

(10) Patent No.: US 12,307,676 B2
(45) Date of Patent: May 20, 2025

(54) METHOD AND APPARATUS FOR GENERATING HIGH DEPTH OF FIELD IMAGE, AND APPARATUS FOR TRAINING HIGH DEPTH OF FIELD IMAGE GENERATION MODEL USING STEREO IMAGE

(71) Applicant: VIEWORKS CO., LTD., Anyang-si (KR)

(72) Inventors: Yu Jung Kang, Anyang-si (KR); Min Gyu Jin, Seoul (KR)

(73) Assignee: VIEWORKS CO., LTD., Anyang-si (KR)

( * ) Notice: Subject to any disclaimer, the term of this patent is extended or adjusted under 35 U.S.C. 154(b) by 404 days.

(21) Appl. No.: 17/856,847

(22) Filed: Jul. 1, 2022

(65) Prior Publication Data

US 2023/0005155 A1    Jan. 5, 2023

(30) Foreign Application Priority Data

Jul. 2, 2021    (KR) .................. 10-2021-0086859

(51) Int. Cl.
*G06T 7/11*    (2017.01)
*G06T 7/593*    (2017.01)

(52) U.S. Cl.
CPC ............ *G06T 7/11* (2017.01); *G06T 7/593* (2017.01); *G06T 2207/10012* (2013.01); *G06T 2207/20081* (2013.01); *G06T 2207/30024* (2013.01)

(58) Field of Classification Search
CPC . G06T 7/11; G06T 7/593; G06T 2207/10012; G06T 2207/20081;
(Continued)

(56) References Cited

U.S. PATENT DOCUMENTS 9,854,149 B2    12/2017    Matsuyama
10,387,765 B2    8/2019    Mailhe et al.
(Continued)

FOREIGN PATENT DOCUMENTS

JP    2016052116 A    4/2016
JP    2017512440 A    5/2017
(Continued)

OTHER PUBLICATIONS

Shajkofci, Adrian, and Michael Liebling, "Spatially-variant CNN-based point spread function estimation for blind deconvolution and depth estimation in optical microscopy." IEEE Transactions on Image Processing 29 (2020): 5848-5861 (Year: 2020).*

(Continued)

*Primary Examiner* — Nay A Maung
*Assistant Examiner* — Vaisali Rao Koppolu
(74) *Attorney, Agent, or Firm* — Rabin & Berdo, P.C.

(57) ABSTRACT

A high depth of field image generating apparatus according to the present disclosure includes a region segmentation unit which segments a region for a stereo image to generate region data, a depth estimating unit which estimates depths for the stereo image to generate depth data, and a high depth of field image generating unit which generates a high depth of field image from the stereo image, the region data, and the depth data.

20 Claims, 9 Drawing Sheets

(58) Field of Classification Search
CPC ............ G06T 2207/30024; G06T 5/73; G06T 2207/10056; G06T 2207/20084; G06T 7/50; G06N 20/00
See application file for complete search history.

(56) References Cited

U.S. PATENT DOCUMENTS

| | | |
|---|---|---|
| 10,645,368 B1 | 5/2020 | Yu |
| 2014/0354781 A1 | 12/2014 | Matsuyama |
| 2015/0254811 A1 | 9/2015 | Sahu et al. |
| 2016/0063696 A1 | 3/2016 | Sawada et al. |
| 2019/0213481 A1* | 7/2019 | Godard ................ G06T 3/4007 |
| 2019/0272638 A1* | 9/2019 | Mouton ................ G06T 7/174 |
| 2019/0285638 A1 | 9/2019 | Mizoguchi et al. |
| 2020/0065942 A1 | 2/2020 | Hiasa |
| 2020/0145642 A1* | 5/2020 | Yu ........................... G06T 5/50 |
| 2021/0073959 A1* | 3/2021 | Elmalem ................ G06N 3/084 |
| 2021/0183089 A1* | 6/2021 | Wadhwa ................ G06T 7/557 |

FOREIGN PATENT DOCUMENTS

| | | |
|---|---|---|
| JP | 2017199235 A | 11/2017 |
| JP | 2020036310 A | 3/2020 |
| KR | 101889886 B1 | 8/2018 |
| KR | 1020190065287 A | 6/2019 |
| KR | 1020200096025 A | 8/2020 |

OTHER PUBLICATIONS

An extended European Search Report issued on Dec. 9, 2022, of the corresponding European application No. 22182608.4.

Japanese Office Action dated Jun. 6, 2023, in the counterpart Japanese Patent Application No. 2022-107264.

Adrian Shajkofci et al., "Spatially-variant CNN-based point spread function estimation for blind deconvolution and depth estimation in optical microscopy." IEEE Transactions on Image Processing, vol. 29, 2020, 5848-5861.

Korean Office Action dated Aug. 16, 2023, in the counterpart Korean application No. 10-2021-0086859.

* cited by examiner

DEPTH DATA

METHOD AND APPARATUS FOR GENERATING HIGH DEPTH OF FIELD IMAGE, AND APPARATUS FOR TRAINING HIGH DEPTH OF FIELD IMAGE GENERATION MODEL USING STEREO IMAGE

CROSS-REFERENCE TO RELATED APPLICATIONS

This application claims priority to and the benefit of Korean Patent Application No. 10-2021-0086859 filed in the Korean Intellectual Property Office on Jul. 2, 2021, the entire contents of which are incorporated herein by reference.

BACKGROUND

Field

The present disclosure relates to a method and an apparatus for generating a high depth of field image, and an apparatus for training a high depth of field image generation model.

Description of the Related Art

A microscope is an instrument which magnifies and observes microscopic objects or microorganisms which are difficult to be observed with the human eye. A slide scanner which interworks with the microscope is a device which automatically scans one or a plurality of slides to store, observe, and analyze an image. In general, since a microscope uses a high magnification lens for capturing tissues or cells, it is difficult to simultaneously capture cells distributed at various depths due to a low depth of field. For example, when a tissue specimen with a thickness of 4 um is used for pathological examination, if a depth of focus of a 40× objective lens is up to 1 um and two or more cells are distributed with a height difference of 1 um or larger in a single capturing area, it is difficult to capture all the cells to be in focus in one image. Further, an object which has a three-dimensional shape rather than a planar shape needs to be captured so that it is necessary to focus on an uneven surface. In general, many cells in the image are located in different positions so that it is difficult to obtain a focused image as a whole.

Accordingly, in order to obtain a high depth of field image in a microscope or a slide scanner, a z-stacking (or focus stacking) technique is used that captures a plurality of images in a fixed position of the x and y-axis while changing a focal plane through z-axis, and then combines the images.

However, the z-stacking technique has many problems in that in order to change the focal plane of the z-axis, an optical structure for multiple capturing at different depths of field needs to be provided and a very larger number of focal planes are repeatedly determined, changed, captured, and combined so that it takes a long time to capture. Further, a method of determining a focusing distance (depth) using a technology such as laser is not appropriate to capture an object which requires image-based focus determination.

SUMMARY

A technical object to be achieved by the present disclosure is to provide a method and an apparatus for generating a high depth of field image to generate a high depth of field image from a captured image without requiring an optical structure for multiple capturing at different depths of field and an apparatus for training a high depth of field image generation model therefor.

In order to achieve the above-described technical objects, according to an aspect of the present disclosure, a high depth of field image generating apparatus includes: a region segmentation unit which segments a region for a stereo image to generate region data; a depth estimating unit which estimates depths for the stereo image to generate depth data; and a high depth of field image generating unit which generates a high depth of field image from the stereo image, the region data, and the depth data.

The high depth of field image generating unit may generate the high depth of field image using a trained deep learning model.

The region segmentation unit or the depth estimating unit may generate the region data or the depth data using the trained deep learning model, respectively.

The region segmentation unit may segment the region for each image which configures the stereo image to generate region data and the depth estimating unit may generate depth data for each segmented region.

The stereo image may be obtained by capturing a tissue or a cell.

The trained deep learning model may be implemented to simulate blind deconvolution using a point-spread function.

In order to achieve the above-described technical objects, according to another aspect of the present disclosure, a high depth of field image generating method includes: a region segmentation step of segmenting a region for a stereo image to generate region data; a depth estimating step of estimating depths for the stereo image to generate depth data; and a high depth of field image generating step of generating a high depth of field image from the stereo image, the region data, and the depth data.

The high depth of field image generating step may use the trained deep learning model.

The region segmentation step and the depth estimating step may use a trained deep learning model.

The region segmentation unit may segment the region for each image which configures the stereo image to generate region data and the depth estimating unit generates depth data for each segmented region.

The stereo image may be obtained by capturing a tissue or a cell.

The trained deep learning model may be implemented to simulate blind deconvolution using a point-spread function.

In order to achieve the above-described technical objects, according to another aspect of the present disclosure, an apparatus for training a high depth of field image generation model includes: as a learning model implemented to output a high depth of field image from an input stereo image, a region segmentation unit which segments a region for a stereo image to generate region data; a depth estimating unit which estimates depths for the stereo image to generate depth data; and a high depth of field image generating unit which generates a high depth of field image from the stereo image, the region data, and the depth data; and a training unit which trains the learning model with learning data including stereo image and a high depth of field image corresponding thereto.

The training unit may calculate a cost function from a high depth of field image output from the learning model and the high depth of field reference image and may train the learning model using the cost function.

The high depth of field image generating unit may generate the high depth of field image using a deep learning model.

The region segmentation unit or the depth estimating unit may generate the region data or the depth data using the deep learning model.

The region segmentation unit may segment the region for each image which configures the stereo image to generate region data and the depth estimating unit may generate depth data for each segmented region.

The stereo image may be obtained by capturing a tissue or a cell.

The deep learning model may be implemented to simulate blind deconvolution using a point-spread function.

The apparatus for training a high depth of field image generation model may further include: a preprocessing unit which preprocesses the stereo image to input the preprocessed image to the learning model.

According to the present disclosure, an optical structure for multiple capturing at different depths of field is not required and a high depth of field image can be generated from the stereo image so that a capturing time is significantly shortened and the high depth of field image can be effectively acquired from the stereo image.

Basic information required to change a focal plane is a depth (z-axis) at which the object is located so that the present disclosure utilizes a stereo technique like the human eye to identify a depth at which the cell is located. Further, in order to remove a time-consuming repeated capturing process, a deconvolution algorithm is performed by means of the stereo image to increase a depth of field. Further, an image which is focused for every object area may be generated by deconvolution restoration based on information obtained by distinguishing an object and estimating a depth of each object from the stereo image.

According to the present disclosure, an all-in-focus high depth of field image may be generally generated from objects (cells, etc.) located in various positions even from a slide which is thicker than that in the related art.

DETAILED DESCRIPTION OF THE EMBODIMENT

Figure 1:
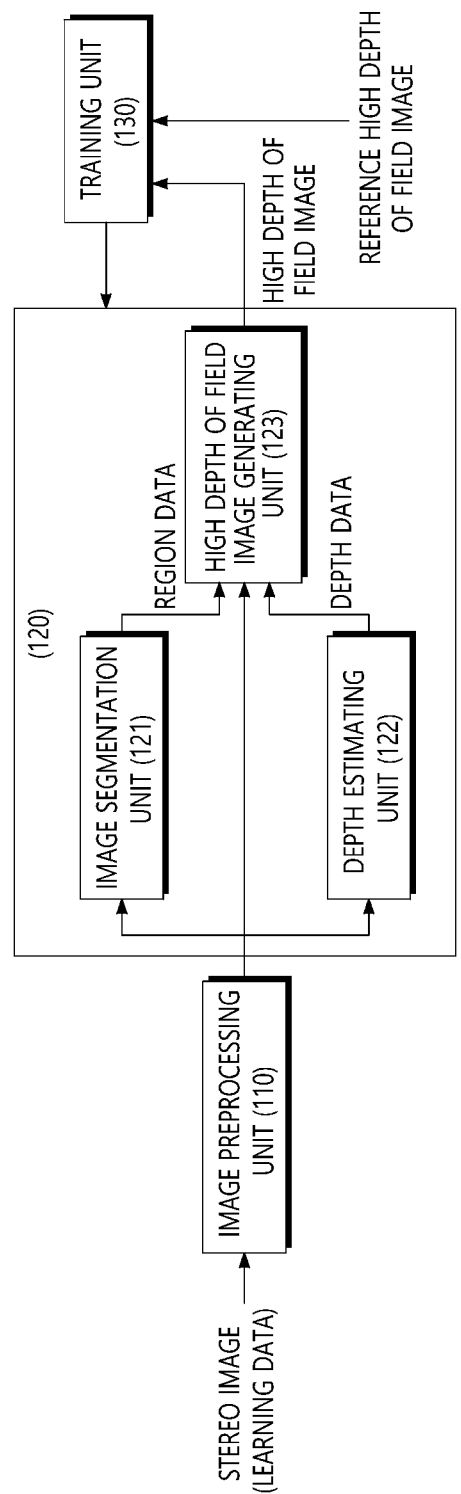
FIG. 1 illustrates an apparatus for training a high depth of field image generation model according to an exemplary embodiment of the present disclosure.

Hereinafter, exemplary embodiments of the present invention will be described in detail with reference to the drawings. Substantially same components in the following description and the accompanying drawings may be denoted by the same reference numerals and redundant description will be omitted. Further, in the description of the exemplary embodiment, if it is considered that specific description of related known configuration or function may cloud the gist of the present invention, the detailed description thereof will be omitted.

The inventor of the present application believed that a stereo image captured by a stereo camera has depth information and the depth information is closely related to the focus so that the high depth of field image can be generated from the stereo image by means of a deep learning model to conceive the present invention. In the exemplary embodiment of the present disclosure, even though the stereo image is explained using an image obtained by capturing the cell as an example, there may be various objects to be captured to include not only living tissues such as cells, but also tissues, materials, or products. Further, in the following description, the high depth of field image is an image having a range of a focused depth broader than that of the single captured image, and for example, refers to an image having a range of a focused depth broader than that of each image which configures the stereo image.

FIG. 1 illustrates an apparatus for training a high depth of field image generation model according to an exemplary embodiment of the present disclosure. The apparatus for training a high depth of field image generation model according to an exemplary embodiment includes an image preprocessing unit which preprocesses a stereo image, a learning model 120 implemented to output a high depth of field image from the stereo image, and a training unit 130 which trains the learning model 120 with learning data.

Figure 2:
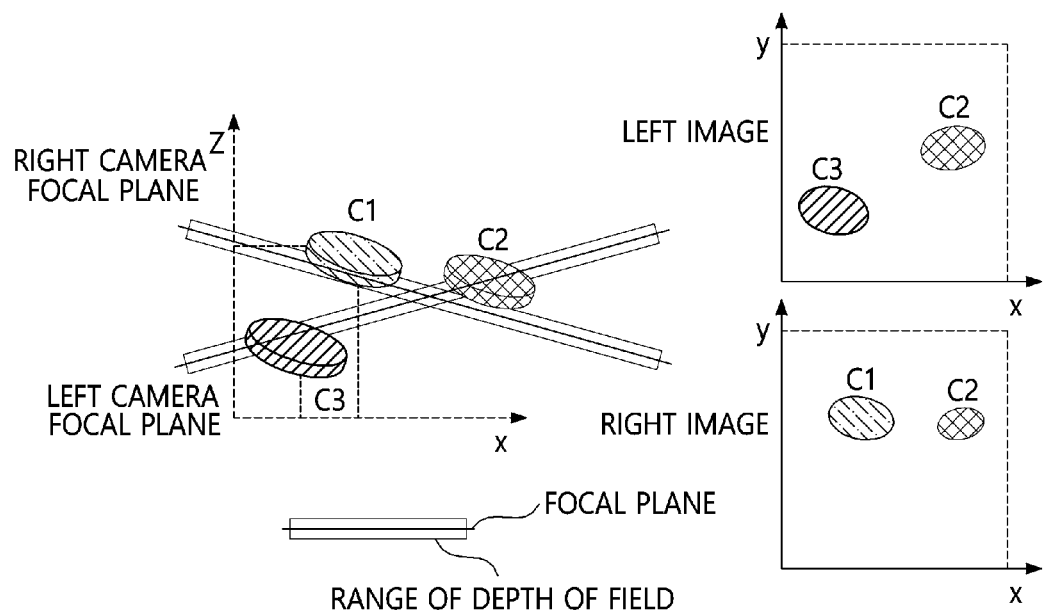
FIG. 2 is a view for explaining an example of a stereo image.

The learning data is formed of a data set of a stereo image and a high depth of field reference image corresponding to the stereo image. FIG. 2 is a view for explaining an example of a stereo image. The stereo image includes a left image and a right image captured by a left camera and a right camera. Referring to FIG. 2, the left camera and the right camera capture different focal planes (a depth of field range) which are inclined at a predetermined angle from each other. For example, when there are three cells C1, C2, C3, only the cells C2 and C3 may be captured from the left image and only the cells C1 and C2 may be captured from the right image. Alternatively, the identical cell is in focus to be clear in one image, but is out of focus to be blurry in the other image.

Figure 3A:
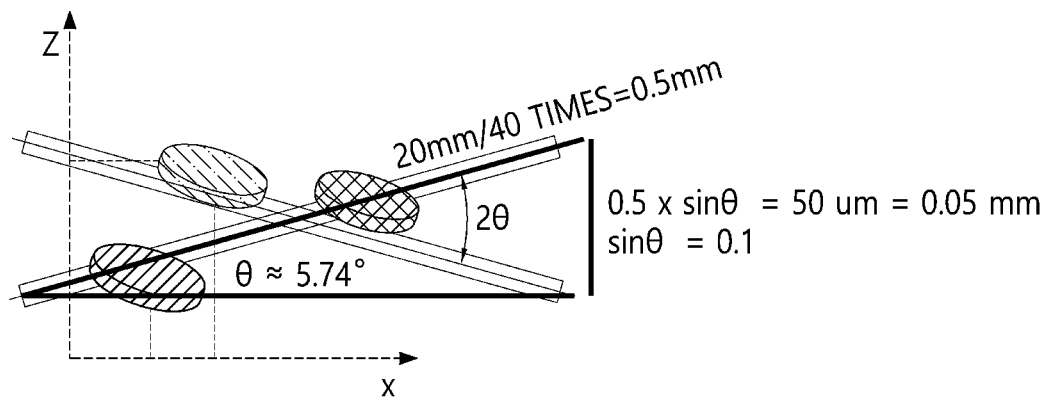
FIGS. 3A and 3B are views for explaining an example of determining an angle between cameras for the cytopathology and the histopathology.
Figure 3B:
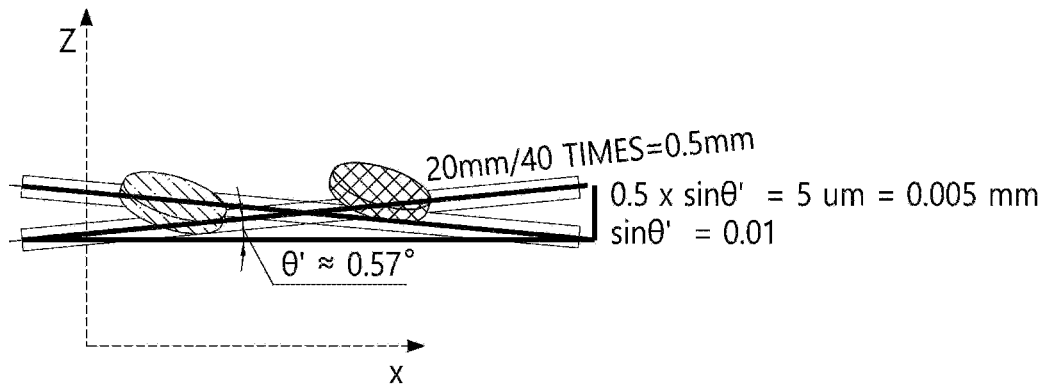

The inclined angle of the left camera and the right camera may be determined in consideration of a target depth of field, a size of a camera sensor to be used, an optical magnification, etc. FIGS. 3A and 3B are views for explaining an example of determining an angle between cameras for the cytopathology and the histopathology. For example, when it is assumed that a camera sensor of a size of 22.5×16.9 mm is used and only 20 mm (w=20) is used as a cropped image after removing an outer distortion, if a depth of field with a thickness of 50 um with a 40× magnification is observed (m is 40 and d is 0.05), $\theta \approx 0.01$ rad$\approx 5.74°$ is derived by Equation w/m×sin $\theta$=d. Since the angle between two camera sensors is 20, the angle is approximately 12° in the cytopathology as illustrated in FIG. 3A and is approximately 1.2° in the histopathology as illustrated in FIG. 3B. As described above, an appropriate angle is derived according to a depth and a camera configuration desired for various objects and targets to obtain a stereo image.

In the meantime, the stereo image may be obtained using two or more cameras having different optical paths or may be obtained using a structure in which one optical path is split into two or more optical paths using a light splitting unit (for example, a beam splitter, a prism, or a mirror) to obtain an image having a focal plane inclined at a predetermined angle by a plurality of cameras.

Figure 4:
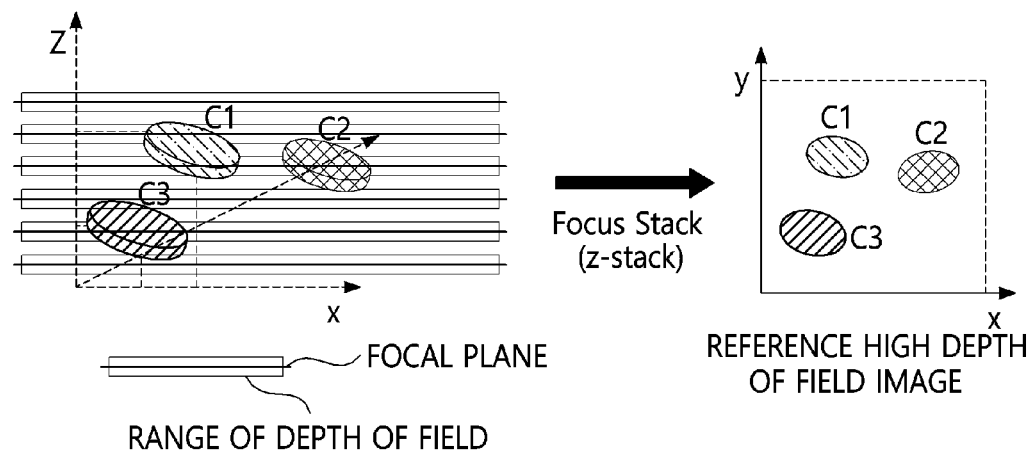
FIG. 4 is a view for explaining an example of a high depth of field reference image.

FIG. 4 is a view for explaining an example of a high depth of field reference image. The high depth of field reference image is a high depth of field image obtained for the same target of the stereo image and is obtained using the existing z-stack technique. That is, the high depth of field reference image may be obtained by combining a plurality of images which is captured while changing a z-axis focal plane in the same (x, y) offset position as the stereo image. Referring to FIG. 4, in the high depth of field reference image, all three cells C1, C2, and C3 are represented.

The image preprocessing unit 110 performs image augmentation and image normalization as preprocesses for the stereo image.

Training data is increased by means of the image augmentation to ensure the robustness against a noise and the model is trained for various capturing conditions. The image preprocessing unit 110 increases an amount of training data by arbitrarily adjusting a brightness, a contrast, and an RGB value of the image. For example, the image preprocessing unit 110 adjusts the brightness, the contrast, the RGB value or a distribution thereof according to an average or a standard deviation or adjusts a staining strength by arbitrarily adjusting absorbance coefficients obtained according to Beer-Lambert Law of Light Absorption.

The image normalization may improve a performance of the learning model and increase a learning convergence speed. In general, the learning data of the stereo image is an image obtained by capturing various cells to be observed with various equipment at various points of view so that capturing conditions are different. Even with the same cell to be observed, different images may be obtained by various environment variables simulated by a capturing condition or augmentation. Therefore, the image normalization may be performed to minimize various variations and match a color space of the image. For example, staining normalization may use light absorbance coefficients of H&E staining according to the Beer-Lambert law.

Depending on the exemplary embodiment, both the image augmentation and the image normalization are performed or only any one of them is performed or both are omitted according to the restriction of the learning resource. Referring to FIG. 1 again, the learning model 120 according to the exemplary embodiment of the present disclosure is built to include a region segmentation unit 121 which segments a cell region for an input stereo image to generate region data, a depth estimating unit 122 which estimates depths for the input stereo image to generate depth data, and a high depth of field image generating unit 123 which generates a high depth of field image from the region data output from the region segmentation unit 121 and the depth data output from the depth estimating unit 122.

The region segmentation unit 121 segments a cell region for a left image and a right image and combines the left image and the right image in which the cell region is segmented to generate region data. When the cell region is segmented, the image segmentation unit 121 separates a cell region and other region as a foreground and a background and separates each cell as a separate object.

A process of segmenting a cell region, for example, may be performed by means of a deep learning model such as DeepLab v3 or U-Net. When the deep learning model is used, a segmentation speed is fast, it is robust to various capturing conditions such as a variation of an image, an accuracy for a complex image is high, and a fine tuning is possible according to the purpose. When there is a restriction in a resource for learning, the process of segmenting a cell region may be performed using the existing region segmentation algorithm such as Otsu Thresholding, Region Growing, Watershed algorithm, Graph cut, Active contour model, or Active shape model.

Figure 5:
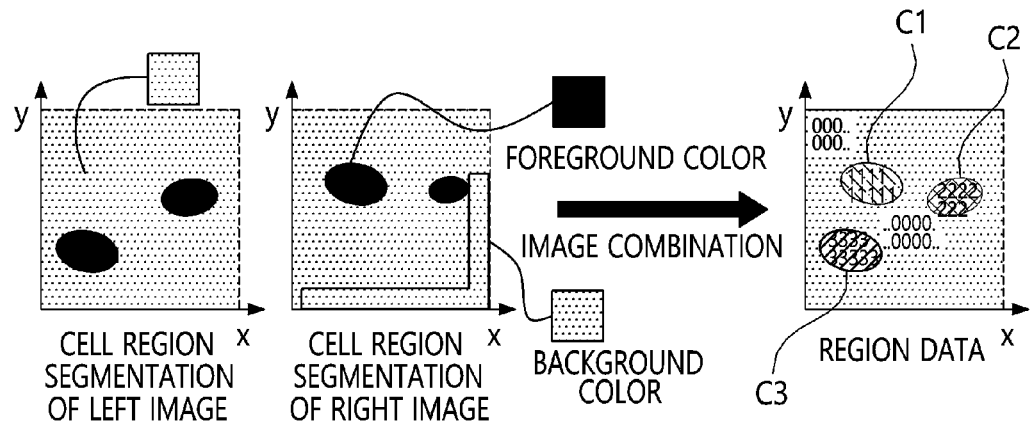
FIG. 5 is a view for explaining a process of generating region data.

The left image and the right image which configure the stereo image have a low depth of field so that all cells may not be observed in two images in the same manner. Accordingly, the left image and the right image may be combined to show cells present at different depths. In the process of combining the left image and the right image, positions of the cells are combined and naturally stitched by means of the deep learning model. FIG. 5 is a view for explaining a process of generating region data. Even though the stereo disparity is considered, if the left and right images are different in the same position, a background color estimated from the entire image is considered to select a foreground color far from the background color from the left and right images. A color having the largest distribution in the edge region of the image may be selected as the background color. As illustrated in FIG. 5, the region data may have a value which separates a background and each cell region. For example, as illustrated in FIG. 5, 0 is assigned to the background and different pixel values such as 1, 2, 3 may be assigned to the cell regions.

In general, the stereo image aims to generate a three-dimensional image by estimating a distance or a depth of an object using a visual difference between two images. In contrast, according to the exemplary embodiment of the present disclosure, the region is segmented using the stereo image. Specifically, in the high magnification images, a depth of focus is very low so that very different objects are frequently captured in the stereo image obtained by simultaneously capturing a single capturing region. For example, if a specific cell is captured only in one image of two images which configure the stereo image, this cell may be very blurred or removed from the image when a general stereo depth estimation method is used. In the exemplary embodiment of the present disclosure, detailed regions are segmented based on shapes and forms of the captured object from two stereo images. At this time, when the segmented positions of the object of two stereo images do not match, depth information on the region is used to clearly express the object whose region is segmented in a final image. By doing this, a high depth of field image with a depth of field beyond a physically limited depth of focus of the objective lens is generated and a depth of field is determined according to a disparity angle of the stereo image.

Generally, even though the image analysis is performed on a high magnification image to determine a position of a lens for an optimal focus, in the exemplary embodiment of the present disclosure, not only an image analyzing method, but also a method of measuring a tissue specimen slide height (position) by a laser sensor is available. According to the method of estimating a slide height by a laser sensor, a precision is lower than that of a lens depth of focus. Further, even though the height of the slide is identified, which height (position) in the thickness of the specimen on the slide where the cell is located at is not known. Therefore, the method is not used for a general high-resolution optical imaging system. However, according to the exemplary embodiment of the present disclosure, the depth of focus may be extended to a thickness similar to a thickness of the specimen so that if only the slide height is determined, an optimized focused image can be ensured. Accordingly, it has an advantage of enabling a laser sensor which was difficult to be biologically used in the related art to be applicable to a lens height adjusting method. When the laser sensor is used, as compared with the method of determining a focal height position by means of the image analysis, the focal position may be quickly determined, so that it is possible to increase the capturing speed. Further, according to the present disclosure, a depth of focus of the image is longer than a depth of focus of the lens so that it is not necessary to analyze an optimal focal position of the image while adjusting a height position of the lens in units similar to or shorter than the depth of focus of the lens. Accordingly, there is no need for a nanometer level ultra-precise lens positioning mechanism for lens focal height adjustment.

The depth estimating unit 122 extracts a feature map for a left image and a right image and estimate a depth by means of a size, a center position, or an observation position of the cell from the feature map. In the center part of the image, there are many regions where objects (cells) are observed identically, but in an outer peripheral portion of the image, there are relatively few regions in which the object is observed identically, due to a depth (z) difference. As the angle of the camera sensor increases for a high depth of field, this phenomenon is more significant and it may affect the image segmentation and depth estimation performance. Accordingly, in order to distinguish the object (cell), a shape, a color, a center position, and an observation position may be considered. A process of extracting a feature map from the left image and the right image may be performed by a convolutional neural network (CNN) model such as VGG, ResNet, or Inception. When there is a restriction on resources for learning, the feature map may be extracted using an existing stereo matching algorithm.

Figure 6:
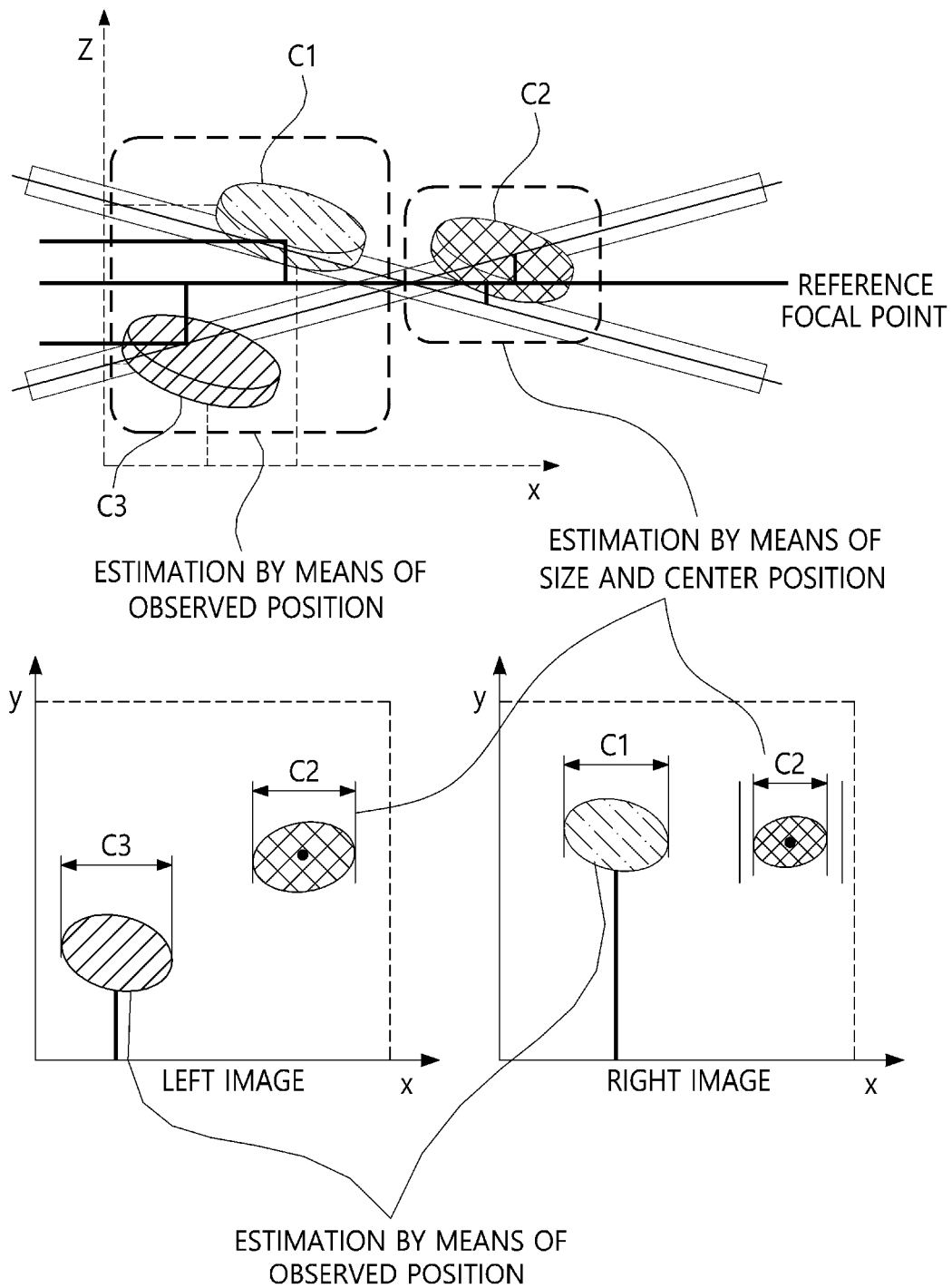
FIG. 6 is a view for explaining a process of estimating a depth by means of a size, a center position and an observation position of a cell.
Figure 7:
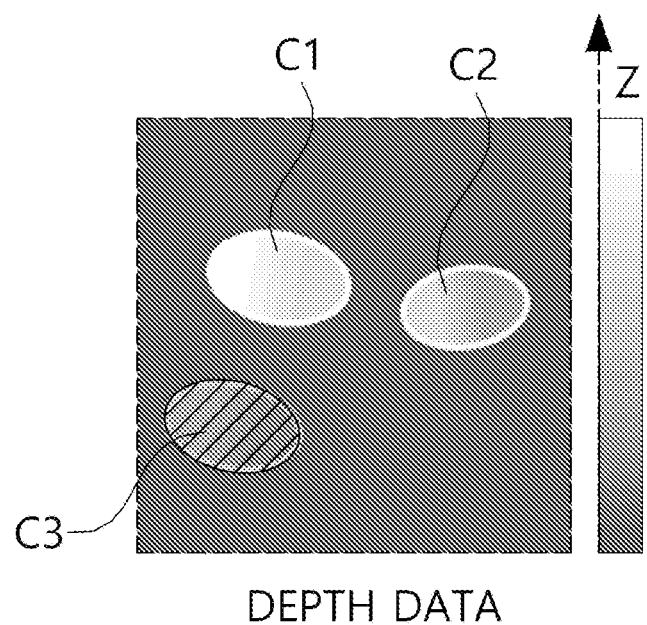
FIG. 7 illustrates an example of depth data obtained for a stereo image of FIG. 2.

FIG. 6 is a view for explaining a process of estimating a depth by means of a size, a center position, and an observation position of a cell. When the identical cell is observed from both the left and right images according to the disparity, the depth may be estimated by comparing a range (size) and a center position of the cell. For example, a cell C2 was observed on a right side from a center in an x-axis, a size was smaller in the right image than in the left image, and the center was observed to be biased so that it is estimated that the cell is located above (that is, a shallow depth) a reference focal point (a point where two focal planes intersect, see FIG. 6). When the cell is observed in only any one of the left and right images, the depth may be estimated in consideration of an angle of the camera which captures the image. For example, the cell C1 was observed in the right image and the center thereof was located at the left side from the x-axis center so that it is estimated that the cell C1 was located above (that is, a shallow depth) the reference focus. Further, a cell C3 was observed in the left image and a center thereof was located at the left side from the x-axis center so that it is estimated that the cell C3 is located below (that is, deep depth) the reference focus. At this time, the depth value may be estimated in consideration of the size of the cell and a distance between the center of the cell and the x-axis center. However, the depth value may also be obtained from the feature map of the left and right images by means of a CNN model such as DeepFocus. FIG. 7 illustrates an example of depth data obtained for a stereo image of FIG. 2. For example, the depth data may have a depth value of 0 for the background and a depth value of 1 to 255 for the cell region depending on the depth.

The results of the image segmentation unit 121 and the depth estimating unit 122 influence each other to generate a final high depth of field image and increase a level of the image.

When a depth of an object to be captured is estimated, the depth estimating unit 122 independently estimates the depths of the segmented regions of the left and right images segmented by the region segmentation unit 121 and then generates final depth data. A depth estimation result of every region may influence the region segmentation result of a high depth of field image to be finally generated. As illustrated in FIG. 6, in the case of the cell C2 which is simultaneously captured in the left image and the right image, in the left and right images, the cell C2 is segmented in different regions and it is determined which region between regions differently segmented in the same position of the left and right images reflects a size of an actual cell more than the other as follows. The depth estimating unit 122 determines that an image which is relatively large and has a clear contrast, between the left and right images, is captured at a focal height close to the real one to estimate the depth of the object and have information of the segmented region from the image. Accordingly, the range of the region of the cell C2 in the final high depth of field image may be generated to be similar to the size represented in the left image.

Referring to FIG. 1 again, a stereo image, region data, and depth data may be input to the high depth of field image generating unit 123. When the stereo image is an RGB image, 8 channels of data including three channels of RGB of each of the left image and the right image, one channel of region data, and one channel of depth data may be input to the high depth of field image generating unit 123. The high depth of image generating unit 123 generates three channels of RGB of high depth of field image from 8 channels of input data by means of the deep learning model.

The high depth of field image generating unit 123 performs deconvolution in consideration of the depth for each region for the stereo image, from the region data, the depth data, and the stereo image, by means of the deep learning model. The deep learning model may be implemented to determine a degree of the focus of a region or a sub region of the image, that is, an in-focus or out-focus level, from the input data and apply the trained point-spread function. The point-spread function describes a shape of light scattering when a point light source is captured as a function. When the point-spread function is inversely applied, a clear image may be obtained from the blurred image. The deep learning model is a CNN model and may be implemented to simulate blind deconvolution which estimates and applies an inverse function of the point-spread function. In order to improve the learning performance of the deconvolution model, input data may be preprocessed by an algorithm such as the Jansson-Van Cittert algorithm, the Agard's Modified algorithm, Regularized least squares minimization method, maximum likelihood estimation (MLE), and expectation maximization (EM).

The training unit 130 trains the learning model 120 with learning data including a stereo image and a high depth of field reference image corresponding to the stereo image. At this time, the training unit 130 trains the learning model 120 by an end-to-end learning.

The training unit 130 calculates a cost function from a high depth of field image output from the high depth of field image generating unit 123 and the high depth of field reference image and updates parameters (weights) of the learning model 120 using the cost function. When all the region segmentation unit 121, the depth estimating unit 122, and the high depth of field image generating unit 123 which configure the learning model 120 are implemented by the deep learning model, the parameters those of may be updated by the learning process. When some of the units is implemented by the deep learning model, parameters of the corresponding deep learning model may be updated. The cost function may be configured by a sum or a weighted sum of the loss function such as residual (a difference between the output high depth of field image and the high depth of field reference image), a peak signal-to-noise ratio (PSNR), a mean squared error (MSE), a structural similarity (SSIM), or a perceptual loss. The Residual, PSNR, and MSE may be used to reduce an absolute error between the output high depth of field image and the high depth of field reference image. SSIM may be used to improve the learning performance by reflecting a structural feature such as a luminance or a contrast. The perceptual loss is used to improve a learning performance for a detailed part and a feature perceived by the human. In order to improve the performance of the region segmentation unit 121, as a loss function, a segmentation loss may be additionally used. The segmentation loss uses a Dice coefficient equation which compares region data output from the region segmentation unit 121 and a region segmentation label of a high depth of field reference image.

The training unit 130 updates the parameter of the learning model 120 using an error back propagation method. The back propagation value may be adjusted by means of an optimization algorithm. For example, a searching direction, a learning strength (learning rate), decay, and momentum may be adjusted based on the pervious state (a back propagation value and direction). By doing this, the learning direction may be optimized to be robust against the noise and increase the speed. As the optimization algorithm, Adam optimizer or stochastic gradient descent (SGD), AdaGrad, and RMSProp may be used. Further, batch normalization may be used to improve the learning speed and the robustness.

The training unit 130 may train the learning model 120 until the value of the cost function is reduced below a predetermined level or reaches a set epoch, by means of the learning process.

Figure 8:
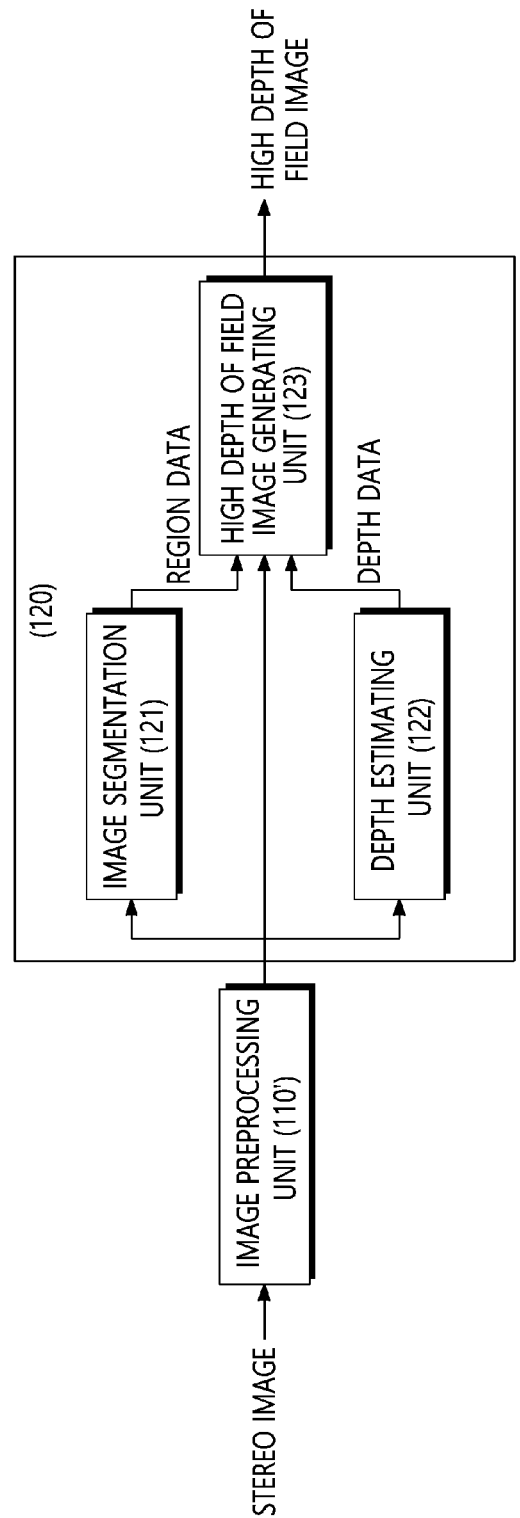
FIG. 8 illustrates a high depth of field image generating apparatus according to an exemplary embodiment of the present disclosure.

FIG. 8 illustrates a high depth of field image generating apparatus according to an exemplary embodiment of the present disclosure. The high depth of field image generating apparatus according to the exemplary embodiment includes an image preprocessing unit 110' which preprocesses a stereo image and a learning model 120 which is trained to output a high depth of field image from the stereo image, by means of the apparatus for training a high depth of field image generation model.

The image preprocessing unit 110' performs image normalization as preprocesses for the stereo image. The image normalization may be the same as the image normalization performed by the image preprocessing unit 110 of FIG. 1.

The learning model 120 includes a region segmentation unit 121 which segments a cell region for an input stereo image to generate region data, a depth estimating unit 122 which estimates depths for the input stereo image to generate depth data, and a high depth of field image generating unit 123 which generates a high depth of field image from the region data output from the region segmentation unit 121 and the depth data output from the depth estimating unit 122. The high depth of field image generating unit 123 is implemented by a deep learning model trained by the above-described apparatus for training a high depth of field image generation model. The image segmentation unit 121 or the depth estimating unit 122 may also be implemented by the deep learning model trained by the above-described apparatus for training a high depth of field image generation model.

Figure 9:
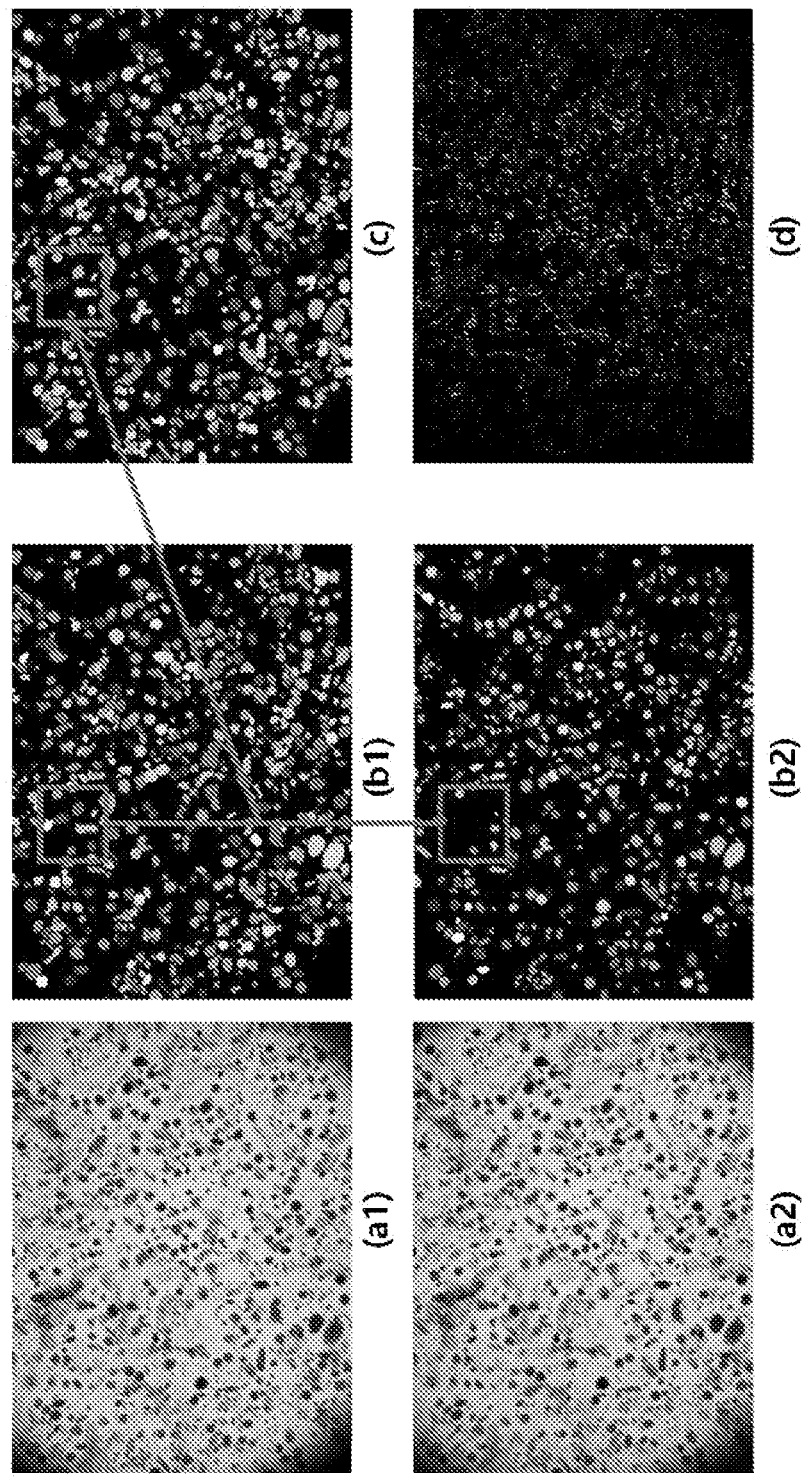
FIG. 9 illustrates an example of a cell region segmentation image, region data, and depth data obtained from a stereo image according to an exemplary embodiment of the present disclosure.

FIG. 9 illustrates an example of a cell region segmentation image, region data, and depth data obtained from a stereo image according to an exemplary embodiment of the present disclosure. Referring to FIG. 9, region data c obtained by combining an image b1 obtained by segmenting the cell region from the left image a1 and an image b2 obtained by segmenting the cell region from the right image a2 and depth data d generated from the left image a1 and the right image a2 are illustrated.

Figure 10:
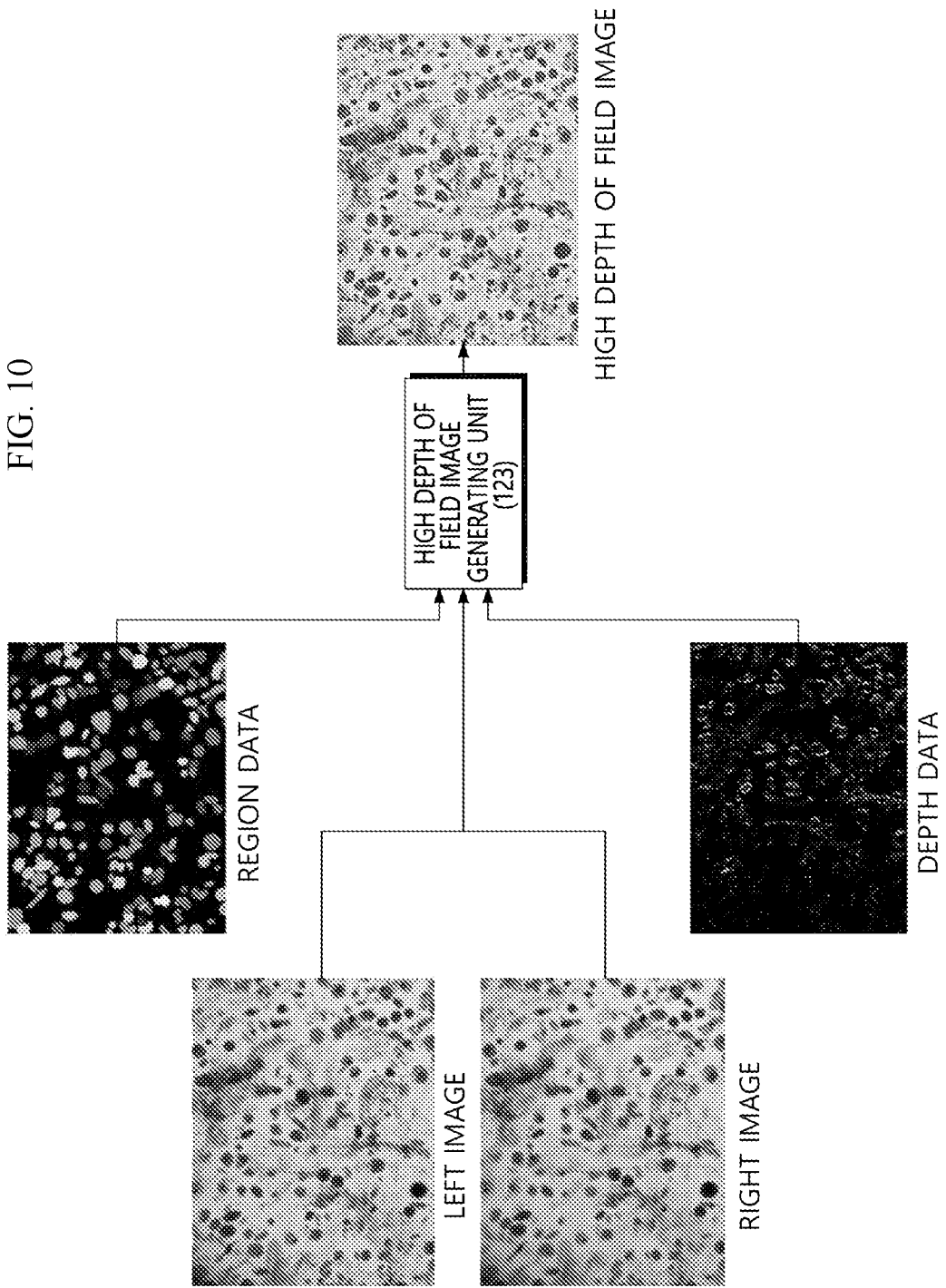
FIG. 10 illustrates an example of a high depth of field image obtained from a stereo image, region data, and depth data according to an exemplary embodiment of the present disclosure.

FIG. 10 illustrates an example of a high depth of field image obtained from a stereo image, region data, and depth data according to an exemplary embodiment of the present disclosure. Referring to FIG. 10, when the left image (three channels), the right image (three channels), image data (one channel), and the depth data (1 channel) are input to the high depth of field image generating unit 123, the high depth of field image generating unit 123 outputs the high depth of field image (three channels) by means of the deep learning model.

The apparatus according to the exemplary embodiments of the present disclosure includes a processor, a permanent storage which stores and executes program data such as a memory or a disk driver, a communication port which communicates with the external device, and a user interface such as a touch panel, a key or a button. Methods which are implemented by a software module or an algorithm may be computer readable codes or program instructions which are executable on the processor and stored on a computer readable recording medium. Here, the computer readable recording medium may include a magnetic storage medium such as a read only memory (ROM), a random access memory (RAM), a floppy disk, and hard disk and an optical reading medium such as CD-ROM or digital versatile disc (DVD). The computer readable recording medium is distributed in computer systems connected through a network so that computer readable code is stored therein and executed in a distributed manner. The medium is readable by the computer, is stored in the memory, and is executed in the processor.

Exemplary embodiments of the present disclosure may be represented with functional block configurations and various processing steps. The functional blocks may be implemented by various numbers of hardware and/or software configurations which execute specific functions. For example, the exemplary embodiment may employ integrated circuit configurations such as a memory, a processing, a logic, or a look-up table in which various functions are executable by the control of one or more microprocessors or the other control devices. Similar to execution of the components of the present disclosure with software programming or software elements, the exemplary embodiment may be implemented by programming or scripting languages such as C, C++, Java, assembler including various algorithms implemented by a combination of data structures, processes, routines, or other program configurations. The functional aspects may be implemented by an algorithm executed in one or more processors. Further, the exemplary embodiment may employ the related art for the electronic environment setting, signal processing and/or data processing. The terms such as "mechanism", "element", "means", and "configuration" are broadly used and are not limited to mechanical and physical configurations. The terms may include meaning of a series of routines of a software in association with the processor.

Specific executions described in the exemplary embodiments are examples, so that the range of the exemplary embodiment is not limited by any way. For simplicity of the specification, the description of another functional aspects of the electronic configurations, control systems, software, and the systems of the related art may be omitted. Further, connections of components illustrated in the drawing with lines or connection members illustrate functional connection and/or physical or circuit connections. Therefore, in the actual device, it is replaceable or represented as additional various functional connections, physical connections, or circuit connections. Unless specifically stated as "essential", "importantly", it may not be an essential configuration to apply the present disclosure.

For now, the present disclosure has been described with reference to the exemplary embodiments. It is understood to those skilled in the art that the present disclosure may be implemented as a modified form without departing from an essential characteristic of the present disclosure. Therefore, the disclosed exemplary embodiments may be considered by way of illustration rather than limitation. The scope of the present disclosure is presented not in the above description but in the claims and it may be interpreted that all differences within an equivalent range thereto may be included in the present disclosure.

What is claimed is:

1. A high depth of field image generating apparatus for generating a high depth of field image from a stereo image capturing a tissue or a cell and including a left image and a right image, the apparatus comprising a processor and instructions executable by the processor to implement:
   a region segmentation unit which segments a region for the stereo image to generate region data;
   a depth estimating unit which estimates depths of the cell or the tissue for the stereo image to generate depth data; and
   a high depth of field image generating unit which generates the high depth of field image from the stereo image, the region data, and the depth data,
   wherein the high depth of field image generating unit combines the left image and the right image in order that cells or tissues segmented from the left image and cells or tissues segmented from the right image are included in the high depth of field image.

2. The high depth of field image generating apparatus according to claim 1, wherein the high depth of field image generating unit generates the high depth of field image using a trained deep learning model.

3. The high depth of field image generating apparatus according to claim 2, wherein the region segmentation unit or the depth estimating unit generates the region data or the depth data using the trained deep learning model, respectively.

4. The high depth of field image generating apparatus according to claim 1, wherein the region segmentation unit segments the region for each image which configures the stereo image to generate the region data, and the depth estimating unit generates the depth data for each segmented region.

5. The high depth of field image generating apparatus according to claim 1, wherein the stereo image is obtained by capturing the tissue or the cell.

6. The high depth of field image generating apparatus according to claim 2, wherein the trained deep learning model is implemented to simulate blind deconvolution using a point-spread function.

7. A high depth of field image generating method for generating a high depth of field image from a stereo image capturing a tissue or a cell and including a left image and a right image, the method comprising:
   a region segmentation step of segmenting a region for the stereo image to generate region data;
   a depth estimating step of estimating depths of the cell or the tissue for the stereo image to generate depth data; and
   a high depth of field image generating step of generating a high depth of field image from the stereo image, the region data, and the depth data,
   wherein the high depth of field image generating step combines the left image and the right image in order that cells or tissues segmented from the left image and cells or tissues segmented from the right image are included in the high depth of field image.

8. The high depth of field image generating method according to claim 7, wherein in the high depth of field image generating step, a trained deep learning model is used.

9. The high depth of field image generating method according to claim 8, wherein the region segmentation step and the depth estimating step use the trained deep learning model.

10. The high depth of field image generating method according to claim 7, wherein the region segmentation step segments the region for each image which configures the stereo image to generate the region data and the depth estimating step generates the depth data for each segmented region.

11. The high depth of field image generating method according to claim 7, wherein the stereo image is obtained by capturing the tissue or the cell.

12. The high depth of field image generating method according to claim 8, wherein the trained deep learning model is implemented to simulate blind deconvolution using a point-spread function.

13. An apparatus for training a high depth of field image generation model, the apparatus comprising a processor and instructions executable by the processor to implement:
   a learning model implemented to output a high depth of field image from an input stereo image capturing a tissue or a cell and including a left image and a right image, wherein the learning model comprises a region segmentation unit which segments a region for the stereo image to generate region data; a depth estimating unit which estimates depths of the cell or the tissue for the stereo image to generate depth data; a high depth of field image generating unit which generates the high depth of field image from the stereo image, the region data, and the depth data,
   wherein the high depth of field image generating unit combines the left image and the right image in order that cells or tissues segmented from the left image and cells or tissues segmented from the right image are included in the high depth of field image; and a training unit which trains the learning model with learning data including the stereo image and the high depth of field image corresponding thereto.

14. The apparatus according to claim 13, wherein the training unit calculates a cost function from the high depth of field image output from the learning model and a high depth of field reference image and trains the learning model using the cost function.

15. The apparatus according to claim 13, wherein the high depth of field image generating unit generates the high depth of field image using a deep learning model.

16. The apparatus according to claim 15, wherein the region segmentation unit or the depth estimating unit generates the region data or the depth data using the deep learning model.

17. The apparatus according to claim 13, wherein the region segmentation unit segments the region for each image which configures the stereo image to generate the region data and the depth estimating unit generates the depth data for each segmented region.

18. The apparatus according to claim 13, wherein the stereo image is obtained by capturing the tissue or the cell.

19. The apparatus according to claim 15, wherein the deep learning model is implemented to simulate blind deconvolution using a point-spread function.

20. The apparatus according to claim 13, further comprising:

an image preprocessing unit which preprocesses the stereo image to input a preprocessed image to the learning model.

* * * * *